Patented May 8, 1951

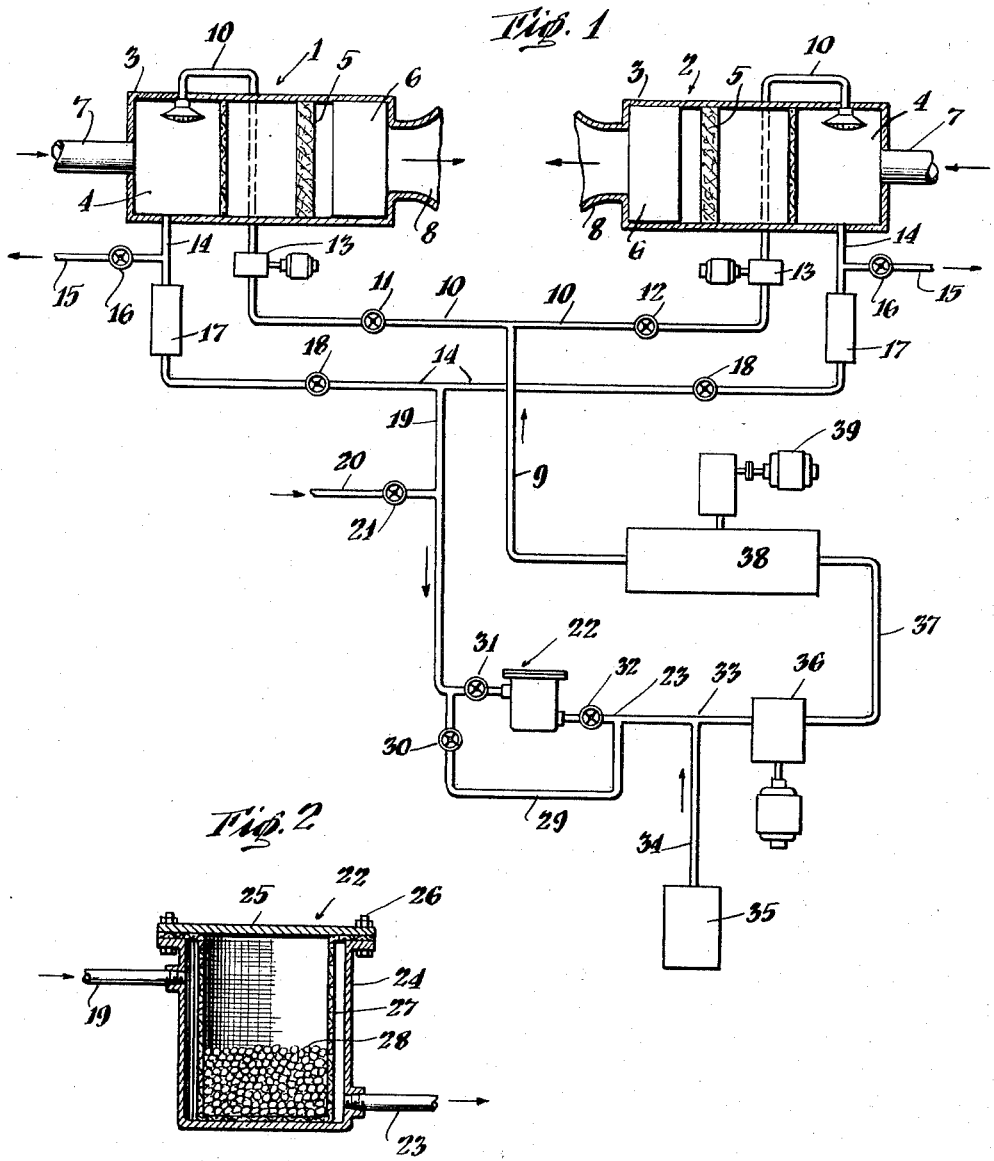

2,552,491

UNITED STATES PATENT OFFICE 2,552,491

CHLORINATION OF AQUEOUS LIQUID IN A RECIRCULATION SYSTEM

Henry C. Marks, Glen Ridge, and Bernard J. Ludwig, Bloomfield, N. J., assignors to Wallace & Tiernan Products, Inc., Belleville, N. J., a corporation of New Jersey Application February 8, 1947, Serial No. 727,340

6 Claims. (Cl. 210—28)

The present invention relates to the chlorination of an aqueous liquid in a substantially closed recirculation system, wherein it is desired to chlorinate the liquid in order to kill or prevent the growth in the liquid of living organisms, for example, so as to prevent the formation of slimes in the liquid.

As such, the invention is related to a co-pending application of Henry C. Marks, one of the present co-inventors, and one Frede Bernhardt Strandskov, Ser. No. 650,724, filed February 27, 1946, and entitled Active Chlorine-Containing Composition and Process of Preparing Same. The line of division between this copending application and the present application is based upon the following principles:

(1) That the said copending application, Ser. No. 650,724, is dominant as to the two cases and carries all claims covering subject matter common to both cases and also claims specific to subject matter disclosed in that application; and (2) That the present application, as the junior of the two, carries only claims restricted to subject matter disclosed in this application and not disclosed in, or supported by, said copending application.

The present invention is somewhat more restricted in scope, relating particularly to the chlorination of liquid in a recirculation system and especially to the prevention of volatilization of chlorine in any form. While the process of the prior application consists mainly of keeping a substantially large fraction of the chlorine in a form sufficiently active for sterilization purposes, that of the present application involves the prevention of anything but the smallest amount of chlorine from combining to form chloramines that would be volatile at sufficiently high concentrations.

In water recirculation systems, such as are conventionally employed in conjunction with air conditioning apparatus or systems, water is recirculated in a substantially closed path, water being added or removed from the system as may be necessary to maintain the amount of water in the recirculatory system substantially constant. At one point in the recirculatory path for the water, it is exposed to the air to be conditioned thereby as by spraying it into a chamber through which the air is passed. This effects a desired humidity control for the air either of a positive or a negative character as may be necessary and further washes the air free of impurities during its passage through the spray chamber, and also serves to control the temperature of the air, for example by cooling it to a desired point. At another part of the recirculatory path for the water, it may be cooled by any suitable refrigeration system wherein its temperature is controlled to a desired point. In such recirculation systems, however, the water picks up more or less living organisms, which in the course of time grow to produce slimes in the water. This either retards the rate of heat transfer between the water and the refrigerant, or tends to clog up some of the passages, or both, thus rendering the process relatively inefficient and sometimes in very hot weather giving other unsatisfactory results. A further reason for the desire to eliminate the micro-organisms is that in some cases, they themselves can give rise to objectionable odors.

It has been found that by the addition of a small amount of chlorine to the water, the growth of slime can be substantially eliminated, for example by a chlorine residual which may range between 0.5 and 5 parts per million. However, when this is done, it frequently introduces an objectionable chlorinous odor into the areas through which the conditioned air is circulated. There may also be present in the water certain amino compounds which form volatile chloramines, these volatile compounds being transferred to the air during washing and giving undesired odors to the air. Even in the absence of such amino compounds, the hypochlorous acid, which is the normal result of adding chlorine to water in the concentrations above discussed, can be aerated out and detected by the occupants of the area. In some instances, the presence of even these traces of chlorine may be not only objectionable to the personnel breathing the air, but also deleterious to industrial processes that are being carried out in the areas treated by the conditioned air. This is particularly true in connection with the manufacture of photographic film, wherein the presence of even small amounts of chlorine in the air results in fogging or clouding the film being manufactured.

In some practical tests conducted with air conditioning systems of this kind, it was found that as little at 43 gamma (millionths of a gram) of active chlorine per liter of air is completely unbearable to persons breathing the air even for a short time. As little as 3 gamma per liter is decidedly unpleasant, but can be tolerated without harmful effects for short periods of time. One gamma per liter is perceptible but probably would not be judged unpleasant by most people. It is believed that about 0.3 gamma per liter is the maximum which will escape detection by the average person.

A primary object of the present invention is to provide for the treating of water in a recirculation system, such for example as an air conditioning system as aforesaid, wherein an adequate amount of chlorine can be added to and maintained in the liquid as active chlorine, without at the same time causing any air coming into contact with the liquid to have an objectionable chlorinous odor and without having this air carry such an amount or concentration of chlorine as may be harmful to industrial processes with which the air may come into contact.

We have found in this connection that the desired results may be obtained if there be added to the recirculating water a sufficient amount of one or more of certain nitrogenous compounds, which will react with the chlorine to bind it up in a form which is non-volatile and yet permit the chlorine as thus bound up to be active in a manner corresponding to active chlorine. In theory the operation or effect from a chemical point of view is believed to be about as follows: A nitrogenous compound having the formula RNH may react with chlorine to form a so-called N-chloro compound having the formula RNCl. The nitrogen in such compounds is trivalent and is bonded directly either to a carbon or to a sulphur atom and also has at least one hydrogen directly bonded thereto, which is replaceable rapidly by chlorine, to form the so-called N-chloro compound. If then there is a stoichiometric excess of the nitrogenous compound as it exists prior to the combination with chlorine, in respect to the concentration of free chlorine, the reaction will be driven toward completion in the direction above named, i. e., to bind up all the free chlorine in the form of the N-chloro compound. This is due to the well known law of mass action. In practice it has been found that when there is present in the liquid a sufficient excess of the nitrogenous compound as hereinafter set forth, the chlorine present is forced to unite with it so powerfully that this chlorine cannot to any substantial degree remain bound to any nitrogen compounds already present in the solution with which such chlorine could form volatile chloramines and thereby cause an odor.

While there are numerous compounds which are satisfactory for addition to an aqueous system as aforesaid, it is believed that the important characteristics reside more in the qualifications of such compounds to comply with certain requirements hereinafter set forth in detail than in the chemical composition as such. For this reason, it is believed that any compounds which will comply with these requirements will be satisfactory to carry out the present invention. These requirements are:

(1) The nitrogenous compound added to the aqueous system should itself be non-volatile, so as to prevent the loss thereof from the system, and also must be capable of reacting with chlorine to form a non-volatile N-chloro compound. This is essential for the reason that if a volatile N-chloro compound were formed, the resulting product would volatilize in the air coming into contact with the water with undesired results comparable to that which is to be corrected.

(2) The nitrogenous compound introduced must be stable toward hydrolysis, so that it will not break down to produce ammonia which could be metabolized by bacteria and result in further bacterial growth. In this connection, the nitrogenous compound per se should also be such as will not serve as food for bacteria.

(3) The nitrogenous compound must be capable of reacting quickly with chlorine to form an N-chloro compound at the high dilution used; and (4) The N-chloro compound formed must be stable in respect to spontaneous chemical decomposition. For example, N-chloro acetanilide would be unsuitable because the chlorine migrates to the benzine ring and thereby becomes inactive.

In addition, there are some other essential, but relatively less critical, requirements; from the point of view of choosing a nitrogenous compound to be added or used in accordance with the present invention. Among these are:

(1) The N-chloro compound formed by the reaction of the nitrogenous compound introduced into the system and chlorine therein should be a relatively active disinfectant. This is so in order that the combination will kill any bacteria present in whatever form it may exist and thus eliminate and continuously prevent the growth of slimes in the water.

(2) Neither the amine or nitrogenous compound, nor the N-chloro compound produced therefrom should be unduly corrosive. This requirement is obvious as otherwise the material of which the system is made will be rapidly eroded away.

(3) The solubility of the nitrogenous compound added should always be high enough to permit the proper proportionate excess in stoichiometric proportions in respect to the amount of chlorine present. In other words, if a system is to be maintained with a relatively high active chlorine content, a corresponding higher concentration of the nitrogenous compound must be used. This compound must be chosen so that it will be water soluble at least to the extent of the concentration to be used. From another point of view, the solubility may have a decided bearing as controlling the manner in which the nitrogenous compound is introduced. This will appear more in detail hereinafter.

(4) In some installations it may be important that both the nitrogenous compound used and the corresponding N-chloro compound should not be toxic to human beings or animals with which it may come into direct or indirect contact. This factor will be influenced by the character of the use or the type of installation in which the invention is applied.

The relative mol or stoichiometric concentration of the nitrogenous compound to that of the chlorine introduced in the system must always be greater than 1:1. From a practical point of view, such relative concentrations of less than about 2:1 are usually not sufficiently effective to come within the purview of the present invention. On the other hand, the maximum limit is not particularly critical and usually is measured by solubility or economical limitations, or both. A stoichiometric ratio of 5:1 will take care of practically all situations. This ratio may be considered from a practical point of view as about the limit which will be necessary in most instances. However, it is not to be considered as an arbitrary limiting factor as either the solubility or the cost is in fact the limiting factor in practically all instances.

In most instances the amount or concentration of available chlorine present will serve as the index for determining the desired concentration of the nitrogenous compound to be added as aforesaid. There may be some situations, however, wherein the water contains some other nitrogenous compounds, such as ammonia, of a type which could react with chlorine to form volatile chloramines or similar compounds. In such a case, the concentration of the volatile-chloramine-forming compound may be so high that it, instead of the available chlorine concentration, is properly determinative of the amount of the nitrogenous compound to be added as aforesaid. It has been found that when a concentration of the desired nitrogenous compound is present in a stoichiometric ratio to the undesired compound of at least 2:1, this desired compound will be effective to take chlorine away from volatile-chloramine-forming compounds or to prevent the combination of available chlorine with such nitrogen compounds to form volatile chloramines. When the concentration of the nitrogen compound in the water capable of forming volatile chloramines is sufficiently high, this concentration may first be determined, and the concentration of the desired nitrogenous compound to be used selectively predetermined therefrom.

While different installations and situations call for the establishment and maintenance of different concentrations of available chlorine, the limitations of such concentration are determined by practical considerations. While in accordance with the present invention this chlorine is present in the form of an N-chloro compound, it may be considered for the present purposes as available chlorine and calculated as to concentration limits as such. The minimum limit of available chlorine concentration is that which is effective to accomplish the desired results in the way of killing any bacteria, which may be initially present in the system, and also to maintain the aqueous liquid thereafter free from harmful bacteria. From a practical point of view this concentration of available chlorine is usually not less than about 0.2 part per million. The upper desired limit of concentration for available chlorine is again dependent upon the requirements of the particular installation. A concentration of available chlorine of 5 parts per million will probably be adequate for most situations, while some particularly difficult conditions may require a concentration as high as 10 parts per million or more. It has been found, however, that any practical concentration of so-called available chlorine can be kept in the solution and from volatilizing as active chlorine by the use of the process according to the present invention.

In this connection, the determination of the amount of active chlorine present will in many, if not most, instances be accomplished by the well-known orthotolidine test, as this test will give a reasonably accurate quantitative measure of chlorine whether it is present in the water in the form of hypochlorous acid or dissolved chlorine or whether it is in the form of most chloramines and N-chloro compounds. In some instances, however, this test is not sufficiently accurate when the chlorine is in the form of certain types of N-chloro compounds. In such cases other known quantitative tests may be employed. These tests, however, form no part of the present invention and will not be further discussed in detail.

A number of different nitrogenous materials have been found satisfactory in accordance with the requirements given above, and also there are many materials which will comply with most, if not all, the requirements and which are suitable for many, if not all, situations wherein the principles of the present invention may be applied. The presently preferred class of materials which has been found suitable in accordance with the present invention are those aromatic sulphonamides having the formula $R_1 \cdot C_6H_4 \cdot SO_2 \cdot NH \cdot R_2$, wherein $R_1$ may be H or alkyl and $R_2$ is an alkyl radical having not over six carbon atoms. The reason for the preference of this class of compounds is that they have the greatest stability to hydrolysis, the greatest resistance to the action of micro-organisms, the highest speed of reaction with chlorine, and the greatest bactericidal activity of the N-chloro compounds which have been tried. From a practical point of view $R_1$ is limited as to the length of the chain or the number of carbon atoms by the requirements of solubility given above. Specific examples of this class are compounds (a) wherein both $R_1$ and $R_2$ are methyl and (b) wherein $R_1$ is methyl and $R_2$ is ethyl. This last compound (b) has been used to a substantial degree in commercial installations embodying the present invention as hereinafter more particularly described.

The nitrogenous compound used may also be aliphatic in character, such as some of the aliphatic sulphonamides. This group of compounds may be considered the second preferred group based upon their stability to hydrolysis being almost as great as that of the aromatic compounds above described under the conditions present, and further upon their resistance to micro-organisms being almost as great as that of the aromatic compounds aforesaid. They also react substantially as rapidly as the above mentioned aromatic compounds to form N-chloro compounds, which N-chloro compounds are about as active as the aromatic compound above set forth. For example, a compound having the formula $R_1 \cdot SO_2 \cdot NH \cdot R_2$ may be used wherein $R_1$ is an alkyl group and $R_2$ is an alkyl group having not over six carbon atoms. Here again the limitations imposed upon both $R_1$ and $R_2$ are those incident to the solubility of the material, it being necessary as aforesaid that the material be sufficiently soluble, so as to be present in solution in the concentrations required in accordance with the present invention to react with the chlorine in the solution. A particular compound in accordance with this group which is contemplated for use in accordance with the requirements given above is N-ethyl methyl sulphonamide, i. e. one in which $R_1$ is methyl and $R_2$ is ethyl.

The next two groups of compounds in the order of preference in accordance with the present invention are the corresponding unsubstituted aromatic and aliphatic sulfonamide compounds as aforesaid; that is, those in which $R_2$ of the formulas given above is hydrogen, the aromatic compound of these two being relatively preferable. These unsubstituted aromatic compounds have the same stability to hydrolysis and resistance to micro-organisms as the homologous nitrogen substituted derivatives above discussed. They are somewhat slower in forming N-chloro compounds than either of the two previous classes and the N-chloro compounds when formed are considerably less active against micro-organisms. The corresponding unsubstituted aliphatic compounds are similar in their activity to the unsubstituted aromatic compounds and correspondingly resemble the general relationships above discussed of the substituted aliphatic compounds as compared with the substituted aromatic compounds.

A final class of compounds to be considered are the hydantoins, which are less resistant to hydrolysis and to micro-organisms than any of the sulphonamides and are less reactive to chlorine to produce the corresponding N-chloro compounds, which in turn are less active bacteriologically than the nitrogen substituted sulphonamides.

On the other hand, there are many nitrogenous compounds capable of reacting with chlorine, which are wholly useless from the point of view of the present invention for the reason that they bind the chlorine up in a form wherein it ceases to be active as a disinfectant or germicide. Materials in this class would include proteins and certain of the degradation products thereof. It is important, therefore, that there be sufficient of the desired type of nitrogenous compound present in order to bind up the chlorine in a form in which it will be reasonably active; while preventing the chlorine from being bound up in some inactive form.

The above classes of nitrogenous compounds which are effective as aforesaid to accomplish the objects of the present invention are not exclusive or intended to be. It is contemplated that any material coming within the definition of the appended claims is to be considered properly within the purview of this invention.

The process aforesaid including both chlorination by the addition of active chlorine in any suitable or available form and the addition of a nitrogenous compound as aforesaid is applicable for many purposes. However, where water is used but once and then allowed to go to waste, it may not be practically economical to carry out this process. From a practical and economical point of view, therefore, the process of the present invention may be considered limited to those cases where a substantial part at least of the water in question is recirculated in the system rather than being wasted after but a single use. On the other hand, a system to which the present invention may advantageously be applied may not be completely closed and may be one wherein water may have to be added from time to time to make up losses due to evaporation or to leakage from the system or may be a system wherein dehumidification may be carried on to such an extent that water must be removed more or less continuously from the system in order to keep the amount therein substantially constant.

In the usual case the nitrogenous compound will be introduced into the circulating water at a point closely adjacent to and preferably in front of the point at which chlorine is introduced, so that there will be a concentration of the nitrogenous compound available to react with chlorine substantially as soon as it is introduced into the system, and so that chlorine may not be volatilized upon coming into contact with air being treated. The introduction of both the chlorine and the nitrogenous compound may be either intermittent or continuous as to either material, the important factor being that there is sufficient of both introduced initially and subsequently, at least from time to time, so as to establish and maintain in the system the concentrations of these two materials to a desired point as hereinabove set forth.

When the system is first started, it is usually advantageous first to introduce the nitrogenous compound in the form of a fine powder or slurry, or an emulsion or solution, in such a way that the desired concentration of dissolved nitrogenous compound is quickly attained. This will prevent initial volatilization of the chlorine. Thereafter the order of introduction of chlorine and the nitrogenous compound used is of minor importance as the concentration of the nitrogenous compound is maintained sufficient to prevent any substantial volatilization of chlorine, whether the latter is introduced continuously or intermittently. Thereafter the concentration may be maintained by the continuous or intermittent introduction of the nitrogenous compound into the circulating water in any desired way, for example by passing the water over or through pellets or briquettes of the nitrogenous compound made up in the desired size and physical condition so as to control the rate of solution thereof.

The process aforesaid has been applied to a small air conditioning unit of the type that is used for a single room. This unit contained about 20 gallons of water, which was refrigerated and continuously pumped to the top of the unit and sprayed onto a metal screen. The air was blown through this metal screen and then through a filter before entering the room. When the water in this unit contained a small amount of ammonia, such as is normally present in natural water, a residual of about three parts per million available chlorine in the water made the room objectionable to the occupants. About 10 grams of N-methyl-p-toluenesulfonamide was added as a solution in water, giving a concentration of about 133 parts per million. After this treatment it was found possible to maintain chlorine residuals up to about 10 parts per million with only a very slight odor perceptible in the room. Lower chlorine residuals, which were entirely adequate for slime prevention, conferred no odor whatsoever on the air.

A larger installation was also made for air conditioning a space occupied by 100 to 200 people and employing an air conditioning system containing about 2,000 gallons of water, which was circulated at the rate of about 870 gallons per minute and wherein refrigeration was supplied by a 250 ton refrigerator. This unit served to condition about 65,000 cu. ft. of air per minute.

In the accompanying drawings there is shown a diagrammatic illustration of this larger installation in substantially the manner in which it was installed. In the drawings:

Figure 1 is a diagrammatic illustration of an air conditioning system as aforesaid with the present invention applied thereto; and Fig. 2 is a view substantially in central vertical section and on an enlarged scale of an apparatus for supplying a nitrogenous compound to the circulating water.

It will be understood that the accompanying drawings are wholly diagrammatic in character and that no attempt is made to simulate either the dimensions or arrangements of the several parts as they actually exist in the installation referred to.

As shown in the drawings, there are provided a pair of more or less similar air washers 1 and 2, each of which comprises a housing 3, including a spray chamber 4, a filter 5 and an electric precipitator 6, in which solid particles and remaining droplets of liquid are removed from the air which flows therethrough as indicated by the arrows from inlets 7 to outlets 8. It will be understood that the inlets and outlets may be suitably connected either for recirculating air or for taking in fresh air from the outside of the building, or both, in accordance with any usual or desired practice. Suitable means are provided for causing or inducing a flow of air through the air washers 1 and 2 at the desired velocity and amount. Such means usually take the form of fans, but are not included in the accompanying diagrammatic showing.

Starting with the circulating water at a point after it has been treated as above generally described and hereinafter to be described in detail as to the accompanying drawings, and after it has been cooled by the refrigeration unit associated with the system, this water passes through a pipe 9, which branches into branch or header pipes 10 and may be controlled by suitable valves 11 and 12 for air washer units 1 and 2 respectively. Suitable pump means generally indicated at 13 may be interposed in the pipes 10 for insuring a desired flow of water under a desired pressure. The pipes 10 lead from the pumps 13 to the spray chambers 3 of the air washers 1 and 2, wherein the water is sprayed into the chambers through a plurality of suitable nozzles, not shown in detail and which per se form no part of the present invention. Drain-off water from the spray chambers 3 passes through pipes 14, each of which is provided with a suitable overflow pipe 15 controlled by a valve 16. In this way when dehumidification is being carried on and water is continuously removed from the air being treated, the excess water may be removed from the system, so as to maintain in the system substantially a constant quantity of water. Suitable strainers, generally indicated at 17, are then interposed in the pipes 14 and flow through these pipes may be controlled by valves 18. The pipes 14 then join into a single pipe 19 passing to the place in the system wherein chemical treatment of the water in accordance with the present invention is effected. In the event that the air is being humidified rather than dehumidified, so that water is being removed from the system by the process, it may be necessary to supply additional water to maintain the quantity thereof in the system substantially constant. For this purpose, a suitable water supply pipe 20 may be connected to the pipe 19 for the introduction of water into the system. Flow through the pipe 20 is controlled by a suitable valve 21.

In accordance with the present invention, it is usually desired to introduce the nitrogenous compound into the system in advance of the introduction of chlorine thereto. The point of introduction of the chlorine should be so arranged in respect to the point at which the water comes into contact with air and in coordination with the speed of reaction between chlorine and the nitrogenous compound used as to provide adequate time for completing the reaction with substantially all the chlorine to form the N-chloro compound as aforesaid. We have shown for this purpose a pot-like apparatus generally designated at 22 and which is shown in detail in Fig. 2, the pipe 19 being connected to an upper portion of this apparatus, and an out-flow pipe 23 being connected to an opposite lower part thereof. The apparatus 22 as shown comprises a pot-like outer casing 24 having a suitable cover 25 secured thereto as by bolts 26 passing through mating flange portions of the pot and cover. Disposed within the casing is a wire basket 27 for containing pellets or briquettes shown at 28 of the desired nitrogenous material.

It is contemplated that once the initial desired concentration of this material in the water has been built up as aforesaid, this concentration may be maintained by continuous or intermittent solution of such material in the water during its normal flow; and that in order to control the rate of solution, the water may be caused to flow through or past a group or pile of pellets or briquettes formed of the desired material and of such shape and size that their rate of solution will be approximately that desired to maintain the concentration as aforesaid.

In order to afford a further control of this concentration, however, we have shown a by-pass pipe 29 connected to the pipes 19 and 23 respectively on opposite sides of the apparatus 22. Flow through the by-pass 29 may be controlled by a valve 30 therein. There are also provided in the pipes 19 and 23, between the points at which the by-pass 29 is connected respectively and the apparatus 22 a pair of valves as shown at 31 and 32. Thus by a proper manipulation of the valve 30 on the one hand, and the valves 31 and 32 on the other, the rate of introduction of the nitrogenous material into the water may be accurately controlled. This arrangement further affords an opportunity for opening the cover of the apparatus 22 whenever desired as for the replenishment of the material 28 therein without interfering with the continuous operation of the remaining apparatus.

Adjacent to the apparatus 22 in the water circulatory system is a point indicated at 33 at which chlorine is introduced into the system, usually in the form of a concentrated solution of chlorine in water. This solution may be introduced through branch pipe 34 from a chlorinating device generally indicated at 35. It will be understood that the device 35 may be a standard type of chlorinator such as is in common use in connection with many water supply systems and which is sensitively adapted for the accurate control and supply of chlorine to the system. It may be automatically and/or manually controlled to maintain a concentration of available chlorine in the system at a desired point.

Beyond the point 33 there is shown a large capacity pump unit generally designated at 36 which forces the water through the system at a desired rate. A pipe 37 leads from the pump to and through a refrigeration unit 38, which is operated by a motor or other prime mover generally designated at 39. The pipe 9 previously described leads from the refrigeration unit 38.

It was found shortly after starting up the system just described that extensive slime growth started in the water system, which decreased the rate of heat exchange and threatened to make the refrigeration capacity inadequate. A gas chlorinator was installed on the system and chlorination began. Because odor difficulty was anticipated, chlorine was fed only intermittently and at a rate such as to establish and maintain a concentration only up to about 0.15 to 0.2 part per million residual active chlorine if the water had contained nothing capable of reacting therewith. The concentration actually attained in ordinary water on this basis was insufficient to maintain a measurable concentration as shown by the orthotolidine test. Even so, the air took on a definitely chlorinous odor that was sufficient to cause the employees to threaten to leave the building. At the same time, this chlorine treatment was insufficient to prevent slime. After a sufficiently long and persistent trial to make certain that the observation was not accidental, it was decided to introduce the present process. To the system was added 350 grams of finely powdered N-ethyl-p-toluene-sulfonamide. In addition 350 grams of five gram pellets made by fusing this compound were introduced at a suitable point where the water would continuously pass over them and maintain the concentration. This point was in practice equivalent to that where the apparatus 22 is shown in the accompanying drawings. In the preliminary trial, chlorine from the gas chlorinator was continuously introduced so as to establish an initial concentration of residual active chlorine of 0.2 part per million, this concentration being gradually built up to an active chlorine residual of about 2 parts per million. There was no trace of odor present in the air, although the unit was operated in this way for about a week to test its full effect upon the employees. In addition, not only did the slime in the system stop increasing, but it began to break up and wash away. After sufficient experience at this rate, the residual active chlorine concentration was built up to about 4 parts per million, where it was maintained for several weeks with no sign of odor in the air and no complaints on the part of the employees.

The small unit, including the use of about 20 gallons of water in the recirculation system mentioned above, was also operated, without the addition of the nitrogenous compound, as a control test. In this test a residual concentration of available chlorine of about 2.5 parts per million gave a moderately strong chlorinous odor to the air being treated, while a 4 to 5 part per million residual concentration of available chlorine gave a strong, highly objectionable odor. As compared with this, the same unit was operated with the addition of N-ethyl methylsulfonamide to the water in a concentration of about 60 parts per million. With this concentration of the nitrogenous compound, it was found that a residual available chlorine concentration as high as 12 parts per million could be established and maintained without yielding a perceptible odor to the air. In this system also and with the conditions as just described, the further addition of one part per million ammonia-nitrogen did not serve to give any perceptible odor to the air.

In another test with this small unit, the water was treated before chlorinating with 5,5-dimethylhydantoin in a concentration of about 64 parts per million. With this concentration of this nitrogenous compound, residual available chlorine concentrations as high as 11 parts per million could be established and maintained with no chlorinous odor perceptible in the air. Again the addition of 1 part per million ammonia-nitrogen also failed to give an odor.

The present process has also been advantageously applied to a water recirculation system used for spraying water on fresh fruit and vegetables for cooling and washing them prior to packaging for shipment. In this case chlorine is used in the water to prevent growth of microorganisms and slimes. The same objectionable results occur in this use even though no air is forcibly blown through the water spray used.

Based on the above evidence of actual tests, it is believed that the other compounds and classes thereof above given as to the permissible range of composition of the nitrogenous compound to be added as aforesaid would react in the same way and to give the same or essentially similar results. While but a few such nitrogenous compounds have been specifically mentioned, the basis upon which such compounds should be selected has been set forth in sufficient detail to enable those skilled in the art to carry out the process herein described and set forth hereinafter in the appended claims. Such claims, therefore, are to be construed validly, as broadly as the state of the prior art permits.

What is claimed is:

1. In a system wherein water is recirculated in a cyclic path, during at least a part of which volatile materials in the water may escape therefrom, and wherein volatilization of chlorine contained in the water would be objectionable to personnel or material which might come in contact with the vapors, the process of preventing growth of micro-organisms and preventing the growth of slimes in the water thus recirculated without imparting an undesired chlorine content to any vapor emanating therefrom, comprising the steps of maintaining in solution in the recirculating water a nitrogenous compound containing no chlorine, which can react with available chlorine in the forms of elemental chlorine and hypochlorous acid to form an N-chloro compound, adding to the recirculating water available chlorine in a form selected from the group consisting of elemental chlorine and chlorine in hypochlorous form, so as to maintain therein a predetermined concentration of available chlorine sufficient to prevent the formation of slimes in the water, said nitrogenous compound being maintained present dissolved in the water in a concentration (including that combined as said N-chloro compound) of at least twice the stoichiometric equivalent of all the available chlorine in the water, said nitrogenous compound and said N-chloro compound being non-volatile and stable in dilute aqueous solution and being non-metabolizable by bacteria, said nitrogenous compound containing a hydrogen atom which is attached to nitrogen and which is replaceable by a chlorine atom to form said N-chloro compound; and said nitrogenous compound being selected from the group which consists of: (a) aromatic sulphonamides having the formula

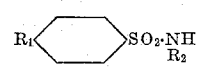

wherein $R_1$ is an alkyl group or hydrogen, and $R_2$ is an alkyl group having not over six carbon atoms or hydrogen; (b) aliphatic sulphonamides having the formula:

$$R_1 \cdot SO_2 \cdot NH \cdot R_2$$

wherein $R_1$ is an alkyl group, and $R_2$ is an alkyl group having not over six carbon atoms or hydrogen; and (c) dialkyl hydantoins.

2. The process in accordance with claim 1, wherein said nitrogenous compound is an aromatic sulfonamide having the formula

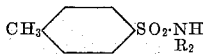

in which $R_2$ is an alkyl radical having not more than two carbon atoms.

3. The process in accordance with claim 1, wherein said nitrogenous compound is an aromatic sulfonamide having the formula

wherein $R_1$ and $R_2$ are alkyl radicals having not over six carbon atoms.

4. The process in accordance with claim 1, wherein said nitrogenous compound is an aromatic sulfonamide having the formula

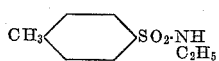

5. The process in accordance with claim 1, wherein said nitrogenous compound is 5,5-dimethylhydantoin.

6. The process in accordance with claim 1, wherein said nitrogenous compound is one having the formula $CH_3 \cdot SO_2 \cdot NH \cdot C_2H_5$.

HENRY C. MARKS.
BERNARD J. LUDWIG.

REFERENCES CITED

The following references are of record in the file of this patent:

UNITED STATES PATENTS

| Number | Name | Date |
|---|---|---|
| 1,894,969 | Wood | Jan. 24, 1933 |
| 2,130,805 | Levine | Sept. 20, 1938 |
| 2,253,762 | Carswell | Aug. 26, 1941 |
| 2,312,221 | Sprigman | Feb. 23, 1943 |
| 2,400,677 | Allen | May 21, 1946 |